March 21, 1961 R. F. HODGSON 2,975,718
ENGINE
Filed Nov. 28, 1958 2 Sheets-Sheet 1
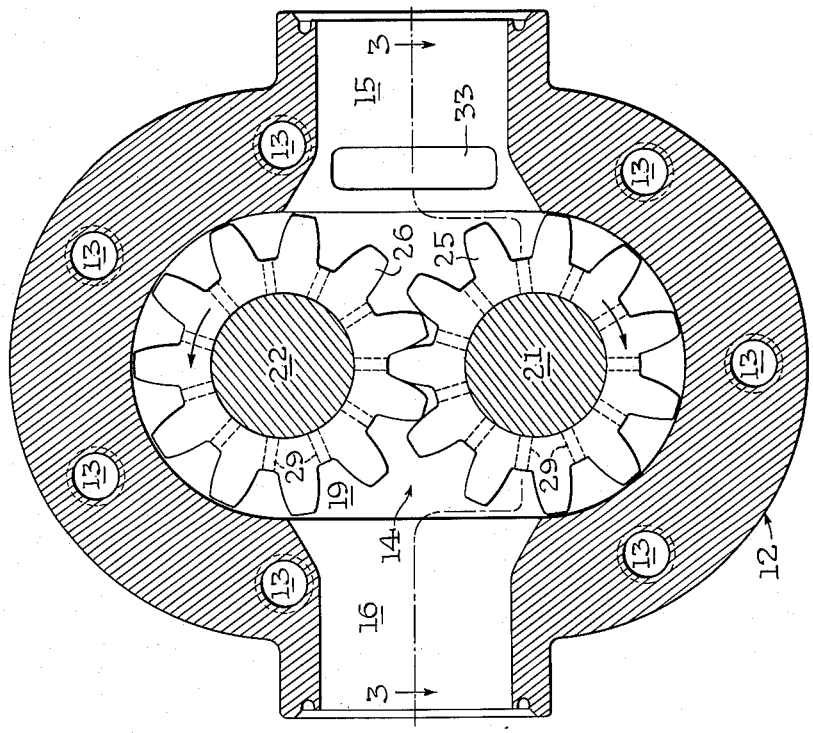
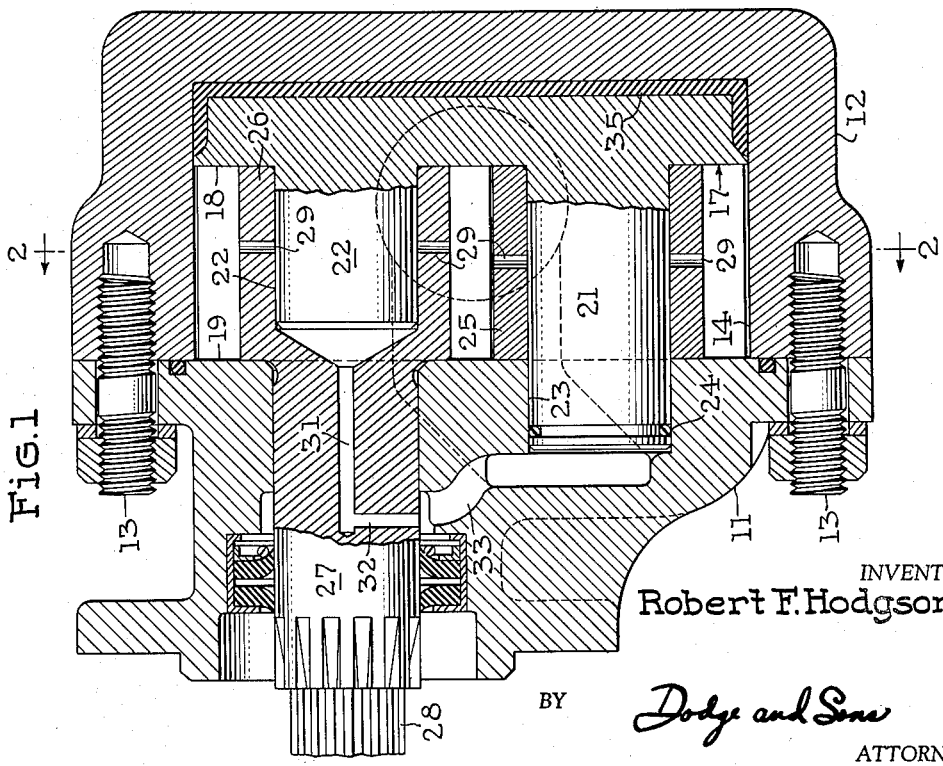
INVENTOR
Robert F. Hodgson
BY Dodge and Sons
ATTORNEYS March 21, 1961   R. F. HODGSON   2,975,718
ENGINE
Filed Nov. 28, 1958   2 Sheets-Sheet 2
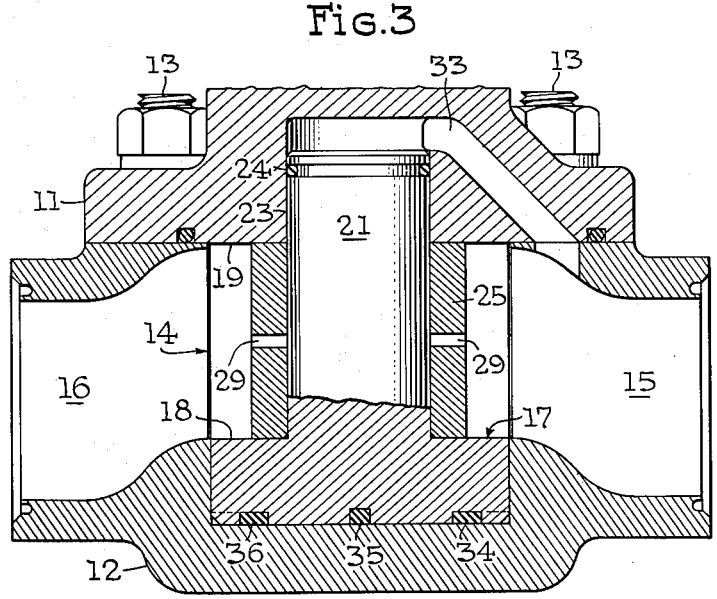
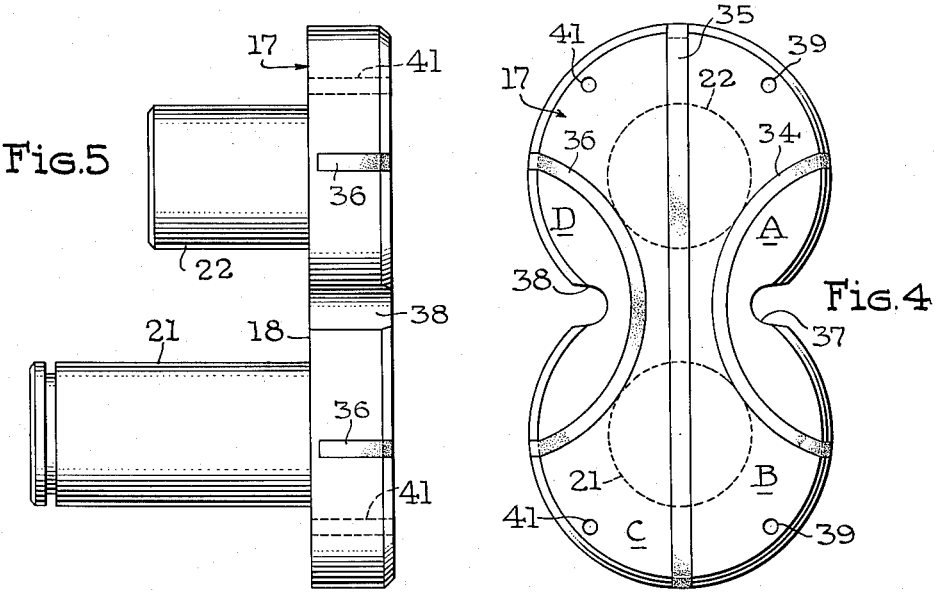
INVENTOR
Robert F. Hodgson
BY Dodge and Sons
ATTORNEYS ered # United States Patent Office 2,975,718
Patented Mar. 21, 1961

2,975,718

ENGINE

Robert F. Hodgson, Kalamazoo, Mich., assignor to The New York Air Brake Company, a corporation of New Jersey Filed Nov. 28, 1958, Ser. No. 776,874

2 Claims. (Cl. 103—126)

This invention relates to fluid pressure engines and more particularly to engines of the gear type. The term engine is used herein in its generic sense, and it will be understood that it includes pumps as well as motors.

These engines commonly include a housing having separable sections which mate along a parting plane that intersects the working chamber, a pair of meshing gears mounted in the working chamber, and a pair of transverse end walls which enclose the working chamber and which are in sealing relationship with the side faces of the two gears. During operation, a controlled amount of high pressure fluid leaks between the mating faces of the end walls and the gears and reduces metal-to-metal contact between these members. The gears are supported by shafts whose opposite ends are carried in bearings mounted in the two housing sections. Frequently the transverse end walls are formed by the front faces of removable wear plates which are located on opposite sides of the gears and whose rear faces are provided with balancing areas which develop pressure forces that bias these plates toward the gears and thus control the amount of leakage fluid flowing between them. These balancing areas must be so dimensioned that the total pressure force acting on the rear face is greater than the total pressure force acting on the front face but not so great as to cause seizure of the gears and the wear plates, and so arranged that this force unbalance does not cause undue distortion or deflection of the wear plate.

This type of engine construction possesses certain inherent disadvantages. First, since the opposite ends of the gear-supporting shafts are journalled in separate housing sections which are usually connected by bolts, precise alignment of the gears is difficult to achieve. Second, since the wear plates are interposed between the gears and the bearings, each wear plate must be provided with two through bores for affording access to these bearings. Because of this, high pressure fluid can escape from the working chamber through these four bores during operation, thus causing a reduction in volumetric efficiency. Finally, the presence of the through bores in the wear plates limits the size and arrangement of the balancing areas on the rear faces and consequently impairs their distortion-minimizing effectiveness.

The object of this invention is to provide an improved engine of this type which is simple and therefore inexpensive to manufacture and which is also efficient in operation. According to the invention, the shafts which support the two meshing gears are formed as integral parts of one of the wear plates and the drive shaft, which is connected with the driving gear, enters the working chamber through a bore formed in the other transverse end wall. This arrangement facilitates accurate alignment of the gears and eliminates three of the four potential leakage points of the prior engines. Furthermore, since the rear face of this wear plate is not interrupted by shaft bearings, the entire rear face can be utilized for balancing areas.

The preferred embodiment of the invention will now be described in detail with reference to the accompanying drawings, in which:

Fig. 1 is an axial sectional view of a gear pump employing the present invention.

Fig. 2 is a sectional view taken on line 2—2 of Fig. 1.

Fig. 3 is a sectional view taken on line 3—3 of Fig. 2.

Fig. 4 is a view of the rear face of the wear plate.

Fig. 5 is an elevation view of the wear plate.

As shown in Fig. 1, the pump comprises a housing having separable portions 11 and 12 which are joined together by stud bolts 13. Housing section 12 is bored, as shown, to form a working chamber 14, of generally oval shape in transverse cross-section, which communicates with inlet and outlet ports 15 and 16. Retained in housing section 12 is a floating wear plate 17 whose front face 18 forms one of the transverse end walls of the working chamber 14. The opposite transverse end wall of this working chamber is formed by the inner face 19 of housing section 11. Since this face is a sealing surface, flatness is essential. In order to facilitate machining, the plane of face 19 is used as the parting plane of housing sections 11 and 12. Projecting from the front face 18 of wear plate 17 are two stub shafts 21 and 22 which are formed as an integral part of the wear plate 17. The projecting end of shaft 21 is received in and supported by bore 23 formed in housing section 11 and leakage along this shaft is prevented by resilient O-ring 24.

Journalled on stub shafts 21 and 22 are two meshing spur gears 25 and 26 whose opposite side faces are in sealing relationship with faces 18 and 19. Gear 26 carries an integral hub 27 which is journalled in a bore formed in housing section 11. The hub 27 is, in effect, the drive shaft of the pump, and carries splines 28 which form the driving connection with the prime mover. Each of the gears 25 and 26 is provided with a series of radial passages 29 which transmit pressure fluid from the high pressure side of the working chamber to the surfaces of stub shafts 21 and 22 for lubricating these shafts during operation. Most of this lubricating fluid is returned to the low pressure side of the working chamber by radial passages 29. Any fluid which leaks along the surface of stub shaft 22 is returned to inlet port 15 via longitudinal and radial passages 31 and 32 formed in hub 27 and drain passage 33 formed in housing section 11, and any fluid flowing along the surface of stub shaft 21 may return to the inlet side of the working chamber along the surfaces 18 and 19. Drain passage 33 also communicates with bore 23 for the purpose of collecting any fluid which might leak past O-ring 24. Since O-ring 24 normally forms an absolute seal for the left end of shaft 21, and since the opposite end of this shaft and the right end of shaft 22 are integral parts of wear plate 17, the mating surfaces of hub 27 and its housing bore define the only path (other than the lubricating path provided by radial passages 29) through which fluid can escape from working chamber 14.

As shown in Fig. 4, the rear face of wear plate 17 is divided into four pressure-balancing areas A, B, C and D by sealing strips 34, 35 and 36 which are seated in grooves formed in the wear plate. These sealing strips can be made of any suitable resilient sealing material. Balancing areas A and D are connected with inlet and outlet ports 15 and 16 by longitudinal slots 37 and 38, and balancing areas B and C are connected with working chamber 14 by drilled passages 39 and 41.

During operation, the low pressure prevailing in inlet port 15 acts on both the front and rear faces of wear plate 17 in the region of balancing area A, and the high pressure prevailing in discharge port 16 acts on the front and rear faces in the region of balancing area D. As a result, the pressure forces acting on the front and rear faces in these two regions are balanced. The opposite faces of the wear plate in the regions of balancing areas B and C are subjected to pressures intermediate those prevailing in ports 15 and 16, but in these regions, the balancing areas develop controlled net forces which urge the wear plate toward gears 25 and 26. This is attributable to the fact that a portion of the area on the front face is occupied by shafts 21 and 22 and the left ends of these shafts are subjected to the pressure in inlet port 15. These net biasing forces maintain surfaces 18 and 19 in sealing relationship with the side faces of gears 25 and 26, and since the lines of action of these forces coincide substantially with the axes of shafts 21 and 22, this sealing action is achieved without undue distortion of wear plate 17.

As stated previously, the drawings and description relate only to the preferred embodiment of the invention. Since many changes can be made in the structure of this embodiment without departing from the inventive concept, the following claims should provide the sole measure of the scope of the invention.

What is claimed is:

1. In an engine of the gear type including a housing having inlet and outlet ports, a working chamber communicating with the ports and provided with two transverse end walls, a pair of meshing gears mounted in the working chamber and having side faces in sealing engagement with the end walls, and a drive shaft connected in driving relation with one of the gears, the improvement which comprises a wear plate mounted in the housing and having a face which defines one of the transverse end walls, the wear plate being supported for movement relatively to the housing in the direction of the other transverse end wall; and a pair of stationary parallel shafts formed as an integral part of the wear plate and projecting only from said face, each shaft serving as a journal for one of the gears.

2. The improvement defined in claim 1 in which the two parallel shafts are formed in one piece with the wear plate.

References Cited in the file of this patent

UNITED STATES PATENTS

| Re. 14,922 | Prouty | July 20, 1920 |
| 1,346,960 | Hurd | July 20, 1920 |
| 1,418,741 | Stallman | June 6, 1922 |
| 1,896,970 | Phillips | Feb. 7, 1933 |
| 2,407,753 | Wallgren | Sept. 17, 1946 |
| 2,471,915 | Thacher | May 31, 1949 |
| 2,484,917 | Vertson | Oct. 18, 1949 |
| 2,619,911 | Svenson | Dec. 2, 1952 |
| 2,645,183 | Parsons | July 14, 1953 |
| 2,809,592 | Miller et al. | Oct. 15, 1957 |
| 2,824,524 | Banker | Feb. 25, 1958 |

FOREIGN PATENTS

| 152,714 | Great Britain | Oct. 18, 1920 |
| 328,963 | Germany | Nov. 11, 1920 |
| 638,936 | Great Britain | June 21, 1950 |